United States Patent [19]

Knapp et al.

[11] Patent Number: 5,491,973
[45] Date of Patent: Feb. 20, 1996

[54] SELF-ACTUATING CONTROL FOR ROCKET MOTOR NOZZLE

[75] Inventors: Raymond Knapp, Sacramento; Robert Woodruff, Carmichael, both of Calif.

[73] Assignee: Aerojet General Corporation, Sacramento, Calif.

[21] Appl. No.: 325,891

[22] Filed: Oct. 17, 1994

[51] Int. Cl.$^6$ .................................................. F02K 1/08
[52] U.S. Cl. ................................................ 60/242; 60/254
[58] Field of Search ............................ 60/233, 234, 242, 60/250, 253, 254, 271

[56] References Cited

U.S. PATENT DOCUMENTS

| | | | |
|---|---|---|---|
| 3,230,704 | 1/1966 | Lovingham | 60/260 |
| 3,608,312 | 9/1971 | Miltenberger | 60/242 |
| 4,109,867 | 8/1978 | Ebeling | 60/242 |
| 4,478,040 | 10/1984 | Johnson | 60/242 |
| 4,495,763 | 1/1985 | Johnson et al. | 60/242 |
| 4,777,795 | 10/1988 | LeCorre et al. | 60/254 |

*Primary Examiner*—Louis J. Casaregola
*Attorney, Agent, or Firm*—Townsend and Townsned and Crew

[57] ABSTRACT

A rocket motor is provided with a self-actuated nozzle throat control mechanism. The motor includes a casing that forms a combustion chamber and houses propellant. An exhaust nozzle extends from the motor casing and is fluidly coupled to the combustion chamber. A pintle assembly is provided to vary the throat area of the nozzle. The pintle assembly includes a pintle and a support member. The pintle is coupled to the support member for movement from a first position to a second position where the pintle extends farther into the throat than when in the first position. A locking member secures the pintle to the support member in the first position when the pressure in the combustion chamber is in a first range and releases the pintle from the support member when the pressure in the combustion chamber changes to a value in another range. With this construction, a multistep pintle, which moves in response to change in combustion chamber pressure, can be constructed without complex control instrumentation. In addition, the highly responsive pintle control system optimizes throat area at each selected combustion phase, thereby improving the performance of multiphase rocket motors.

17 Claims, 3 Drawing Sheets

5,491,973

SELF-ACTUATING CONTROL FOR ROCKET MOTOR NOZZLE

BACKGROUND OF THE INVENTION

The present invention relates to propulsion control systems generally. More particularly, the invention relates to a propulsion control system that varies nozzle throat geometry to accommodate multiple propulsion phases.

Surface-to-Surface, Surface-to-Air, Air-to-Air, and Air-to-Surface missiles typically depend on two phases of propulsion. These include a high thrust boost phase and a lower thrust sustain phase. The former provides velocity and the latter sustains that velocity. Typically, such a two-phase propulsion system is accomplished with a two grain motor. However, among the drawbacks of multiple grain motor configurations is that there is only one nozzle throat which is optimized for one of the grains, but not both. As a result, there are large inefficiencies during one of the phases. Although pintle systems have been used in high performance rockets to vary nozzle throat area during flight to compensate for variations in combustion chamber pressure due to nozzle erosion and/or ballistic instabilities, for example, these systems have not been without limitation. More specifically, pintle systems generally involve complicated instrumentation, feedback control loops, and electric or hydraulic motor or squib actuation.

SUMMARY OF THE INVENTION

The present invention involves a rocket motor control system that avoids the problems and disadvantages of the prior art. This is accomplished by providing a rocket motor having a self-actuated nozzle throat control mechanism. The motor includes a casing that forms a combustion chamber and houses propellant. An exhaust nozzle extends from the motor casing and is fluidly coupled to the combustion chamber. A pintle assembly is provided to vary the throat area of the nozzle. The pintle assembly includes a pintle and a support member. The pintle is coupled to the support member for movement from a first position to a second position where the pintle extends farther into the throat than when in the first position. A locking member secures the pintle to the support member in the first position when the pressure in the combustion chamber is in a first range and releases the pintle from the support member when the pressure in the combustion chamber changes to a value in another range.

With the construction described above, a multistep pintle (such as a two-step pintle) which moves in response to change in combustion chamber pressure can be constructed without complex control instrumentation. In addition, the highly responsive pintle control system optimizes throat area at each selected combustion phase, thereby improving the performance of multiphase rocket motors.

According to another aspect of the invention is a pressure responsive actuating system for moving the pintle from the first to second position. This system includes a pressure chamber or plenum that is formed in the support member and fluidly coupled to the combustion chamber through a channel formed in the pintle. In addition, a one-way check valve is positioned in the pintle channel to regulate pressurized fluid flow into the pintle chamber or plenum. The pressure in the support member chamber forces the pintle toward the second position when the pressure difference between the combustion and pintle chambers exceeds a threshold value. This configuration provides a pintle actuating mechanism that is simple to construct and compact in configuration when space is at a premium.

According to a further aspect of the invention, the locking member comprises a shear pin that extends between the pintle and pintle support. The mechanical properties, size and number of pins are selected based on the application (i.e., the pressures involved). In this manner, a responsive and simple pressure detecting mechanism is provided.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
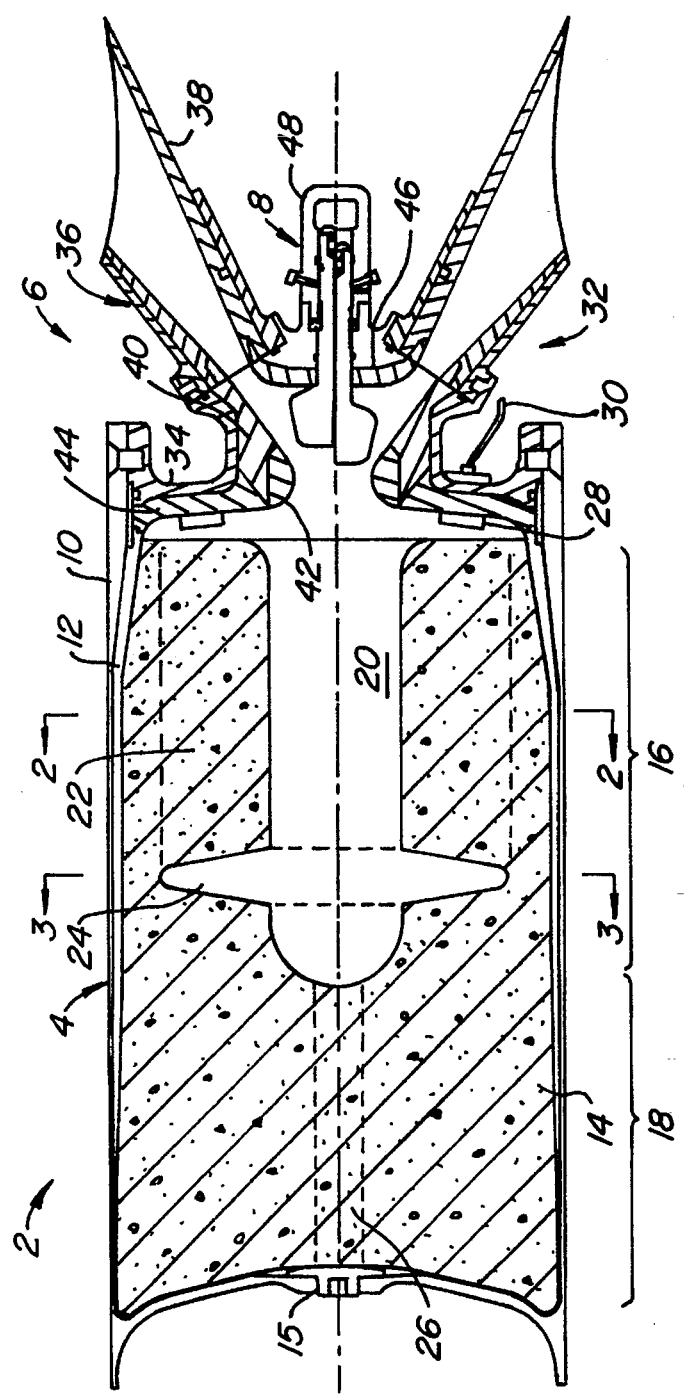
FIG. 1 is a sectional view of a rocket motor constructed in accordance with the principles of the present invention with the pintle assembly split to show multiple pintle positions.

Referring to the drawings in detail, wherein like numerals indicate like elements, rocket motor 2 is shown constructed according to the principles of the present invention. Rocket motor 2 generally includes combustion chamber portion 4, nozzle portion 6 through which high pressure gases generated in the combustion chamber exit the rocket motor, and self-actuated nozzle throat control assembly or pintle assembly 8.

Referring to FIG. 1, combustion chamber portion 2 includes motor casing 10 and liner 12, which contains energetic composition or solid propellant 14 and insulates casing 10 as is conventional in the art. A conventional casing plug 15 is provided at the head of the casing as shown in the drawings. Materials used to construct the casing and liner can vary widely as will be evident to one skilled in the art. For example, materials used to construct liner 12 include phenolics.

In the preferred embodiment, the propellant is configured to provide multiple burn phases, e.g., a boost phase and a velocity sustain phase. Although the grain shape can vary according to the desired burn characteristics as would be apparent to one of ordinary skill, a particular grain configuration is shown for exemplary purposes and described below.

Referring to FIG. 1, propellant 14 is "single grain multi-surface configured". More specifically propellant 14 is configured to provide a high surface burn area portion and a lower surface burn area portion as is conventional in the art. The high surface area portion is configured to provide a relatively high burn rate suitable for generating sufficient thrust to provide the rocket with the desired velocity during the boost phase. The reduced surface area portion is configured to provide a low burn rate relative to the high surface area portion for generating sufficient thrust to maintain rocket velocity.

Figure 3:
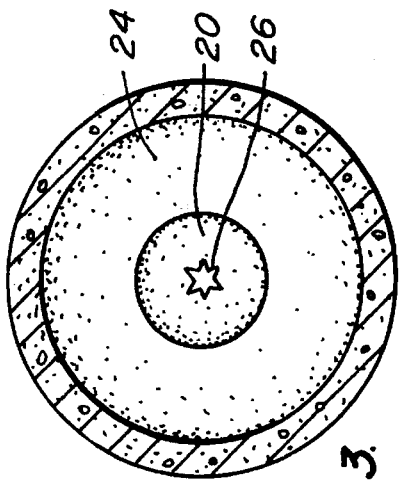
FIG. 3 is a sectional view taken along line 3—3 in FIG. 1.
Figure 2:
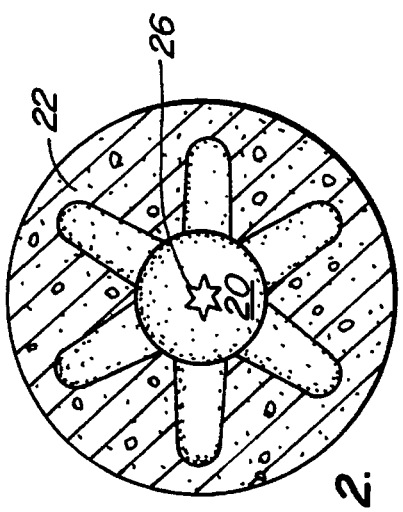
FIG. 2 is a sectional view taken along line 2—2 in FIG. 1.

Referring to FIGS. 1–3, particular high and low surface area configurations will be described for purposes of example. High surface area portion 16 is shown with a cylindrical cavity 20 surrounded by section 22 which comprises a plurality of circumferentially spaced projections or spokes that extend toward cavity 20. Section 22 merges into transition portion 24 which comprises a propellant surface area change from the larger boost phase surface area to the smaller sustain phase burn area. Reduced surface area portion 18 has a relatively small star-shaped central bore formed therethrough which is designated with reference numeral 26. Although a particular two-phase motor has been described, it should be understood that the particular configuration of the propellant can vary according to application requirements as discussed above and that the illustrated configuration is provided merely for purposes of example and is not intended to limit the scope of the invention. Thus, for example, other single grain multisurface configurations or multiple propellant grains can be used.

Rocket motor 2 also includes an ignitor which can be any of several well-known ignitors, e.g., electrically ignited explosive fuse or magnesium wires with pyrotechnic compositions and multi-pulse ignition systems comprising a squib and an ignitor which can provide many pulses or ignitions. A conventional electrical squib ignition system at the aft end of the combustion chamber is shown in FIG. 1. This system includes an ignitor 28, which is preferably annular, and electric initiator 30.

Nozzle portion 6 comprises nozzle assembly 32 which includes combustion chamber aft closure support 34 and nozzle 36 and an end wall for the combustion chamber. Aft closure support 34 preferably has a generally annular configuration and provides support for nozzle 36 and forms an end wall for the combustion chamber. More specifically, one end of aft closure support 34 is coupled to the motor casing via bolts, for example, and the other end portion of aft closure support 34 is coupled to nozzle 36 such as by welding or other securing means. Nozzle 36 generally includes exit cone portion 38, intermediate portion 40, which includes a conventional generally annular nozzle throat insert 42, and inner head portion 44, which is also secured to casing 10 and forms the aft portion of the combustion chamber. Nozzle 36 further includes generally annular base portion 46 that extends into the upstream end of exit cone 38. In the embodiment illustrated in FIG. 1, pintle assembly 8 is positioned outside the combustion chamber and aft base portion 46 which advantageously provides central support for the pintle assembly. However, it should be noted that although nozzle 36 is shown having an generally annular transverse cross section, other nozzle configurations can be used such as a bifurcated or single axial nozzle.

The sizes and materials used to construct the nozzle can vary widely as would be apparent to one of skill in the art. For example, the various portions of the nozzle are selected according to temperature requirements in the various nozzle regions as is conventional in the art. For purposes of example, typical materials include graphites and reinforced phenolics.

Pintle assembly 8 is constructed so that the head of the pintle moves from a first to a second location in response to pressure conditions in the combustion chamber. In the preferred embodiment, the pintle is moved from a first position where the nozzle throat area is optimized for a first burn phase, e.g., a boost phase, to a second position where it changes the nozzle throat area to optimize conditions for a second burn phase, e.g., a velocity sustain phase. The throat area of the nozzle is defined as the minimum transverse area within generally annular nozzle throat insert 42. Thus, the throat area of the nozzle when the pintle of pintle assembly 8 is positioned therein is defined as the minimum annular area between the pintle and nozzle insert.

Figure 4:
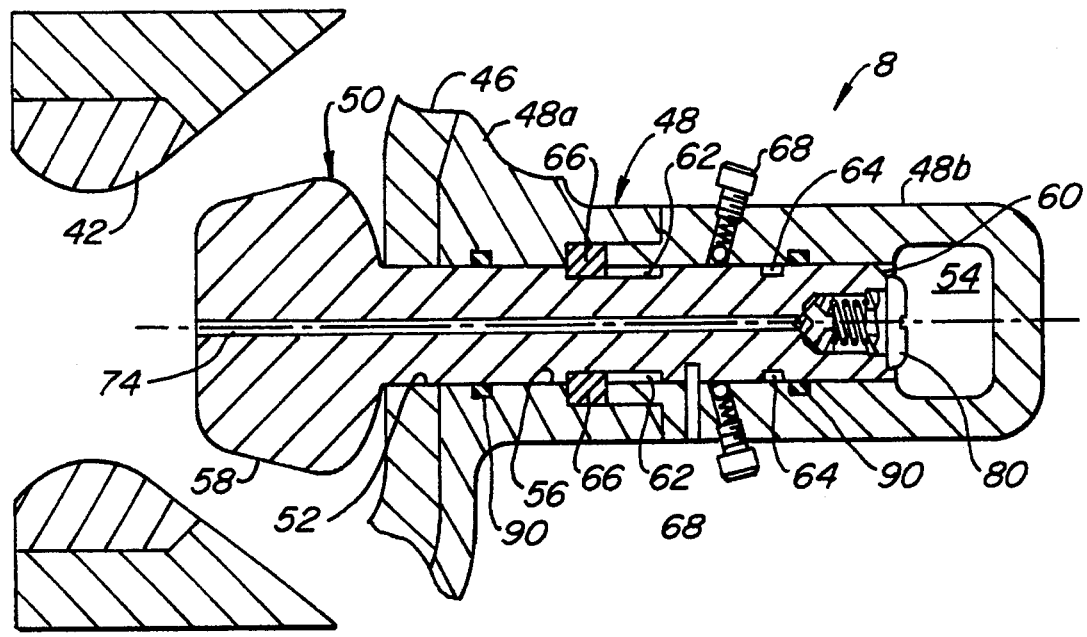
FIG. 4 is an enlarged view of the pintle assembly of FIG. 1 showing the pintle in a first position.
Figure 5:
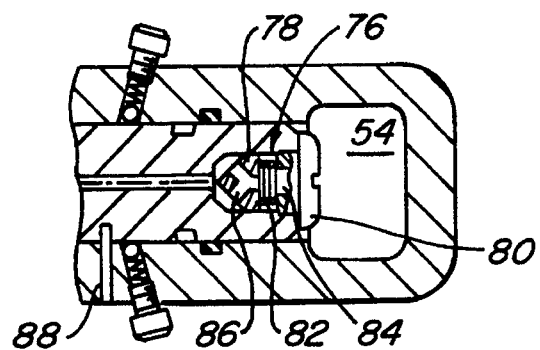
FIG. 5 is an enlarged view of a portion of the pintle assembly of FIG. 4 with the pintle assembly being in an intermediate phase.
Figure 6:
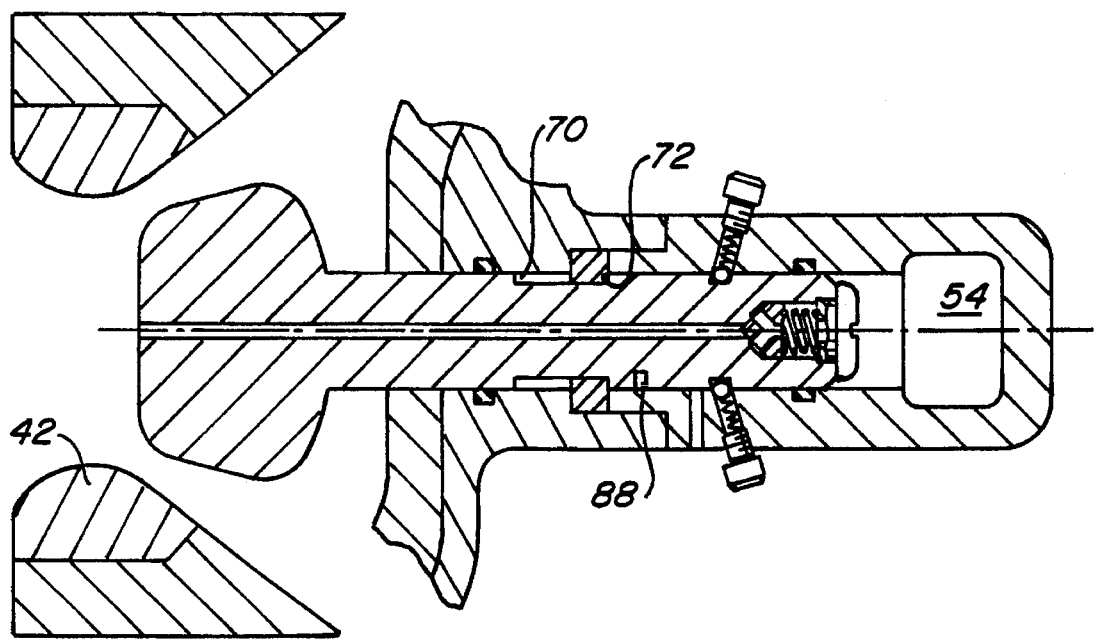
FIG. 6 is an enlarged view of the pintle assembly of FIG. 4 showing the pintle in a second position.

Referring to FIGS. 4–6, pintle assembly 8 generally includes pintle housing 48 which is preferably cylindrical in configuration. Housing 48 preferably comprises forward and aft portions 48a and 48b which are secured together, but can comprise in the alternative a single integrally formed element. Forward portion 48a is secured to exit cone 38 and base portion 46 by conventional means such as welding. Base portion 46 includes a hole 52 formed therethrough for slidably receiving pintle 50 which also is slidably received within bore 56 that is formed in forward and aft portions 48a and 48b. In addition, aft portion 48b includes an enlarged cavity 54 which is fluidly coupled to central bore 56 in which pintle 50 is slidably mounted. Cavity 54 forms a pintle actuation chamber or plenum, as will be discussed in more detail below.

Pintle 50 includes a head portion 58 and a blind end portion 60. In addition, pintle 50 includes one or more slots 62 depending on the stop member configuration and depressions 64, both of which are formed in the outer surface of the pintle, for cooperating with stop member 66 (which can be a generally annular member or comprise one or more segments) and conventional spring-loaded detent mechanisms 68. Stop members 66 abut with abutment surfaces 70 of slots 62 to limit the extent pintle 50 is retracted into housing 48, as shown in FIG. 4. In this position, the pintle is positioned relative to the nozzle to provide the desired throat area for a boost phase, for example. In contrast, aft abutment surfaces 72 limit forward movement of pintle 74 as shown in FIG. 6. In this position, the detent mechanisms (each including a cap secured in the support and a spherical element coupled thereto through a spring) also register with depressions 63. Thus, stop members 66 which extend from within housing 48 into slots 62 provide a two-step pintle position adjustment. The position of the stop members and detent mechanisms are selected according to the rocket motor requirements so that the pintle head portion 58 is positioned at the desired location to provide the desired nozzle throat area when, in a boost phase, for example, and in another position as shown in FIG. 6 to provide, for example, optimal burn and thrust characteristics during the period after boost. The mechanism for moving the pintle from a first position as shown in FIG. 4 to a second position as shown in FIG. 6 will be described in detail below with particular reference to FIG. 5.

Pintle 50 includes a central bore or channel 74 that has an inlet fluidly coupled to the combustion chamber and an enlarged diameter at its aft portion for receiving valve 76, which preferably is a one-way check valve. Valve 76 includes a valve plug 78 coupled to head or screw cap 80 via spring 82. Screw cap 80 is threadably coupled to the blind end portion of pintle 50 and includes a bore 84 that is fluidly coupled to Y-passage 86 formed in valve plug 78. When the pressure in pintle bore 74 is greater than the pressure in chamber 54, valve plug 78 is displaced toward chamber 54 placing Y-passage 86 in fluid communication with pintle channel 74, and allowing pressurized fluid from the combustion chamber to be introduced into chamber 54. On the other hand, when the pressure in chamber or plenum 54 exceeds that in pintle channel 74 and, thus, exceeds the pressure in combustion chamber 4, the pressure in chamber 54 exerts a force on the blind end portion of pintle 50 that urges the pintle to the second position illustrated in FIG. 6. A shear pin or frangible member 88 extends from pintle housing 48 into pintle 50 to lock pintle 50 in the home position illustrated in FIG. 4 until the pressure difference between the chamber 54 and the combustion chamber within motor casing 10 exceeds a preselected value. As would be apparent to one of skill, a multiple shear pin configuration also can be used.

In operation, the pintle is initially in the home position, as illustrated in FIG. 4, which is the position to provide optimum performance for a boost thrust, for example. On motor ignition, and as the propellant reacts to generate high pressure product gas, the pintle maintains its position. Chamber pressure in the motor rises to, for example, 2600 psia. The channel in the pintle allows the combustion chamber pressure to pressurize chamber 54 to the combustion chamber pressure; in this example, 2600 psia. The check valve in the pintle combined with seals 90, which preferably are annular, maintain the pressurized fluid in pintle assembly chamber 54. The pintle is held in position by the mechanical stop 66 and shear pin 88, as shown in FIG. 4.

As the grain changes in this example from a boost to a slow burning sustain phase, the combustion chamber pressure begins to drop. As the combustion chamber pressure drops past a certain pressure, for example 800 psia, the force balance between the 2600 pound psia behind the pintle in chamber 54, as compared to the 800 psia forward pressure in the combustion chamber, causes the shear pin to shear and the pintle to move forward until stop member 66 is in the position shown in FIG. 6 where the detent mechanism 68 falls in place and ensures that the pintle does not retract again as a result of the angle of the detent mechanism shown in the drawings. As discussed above, the shear pin(s) strength is selected based on the desired threshold force intended to move the pintle from the first to second position.

Figure 7:
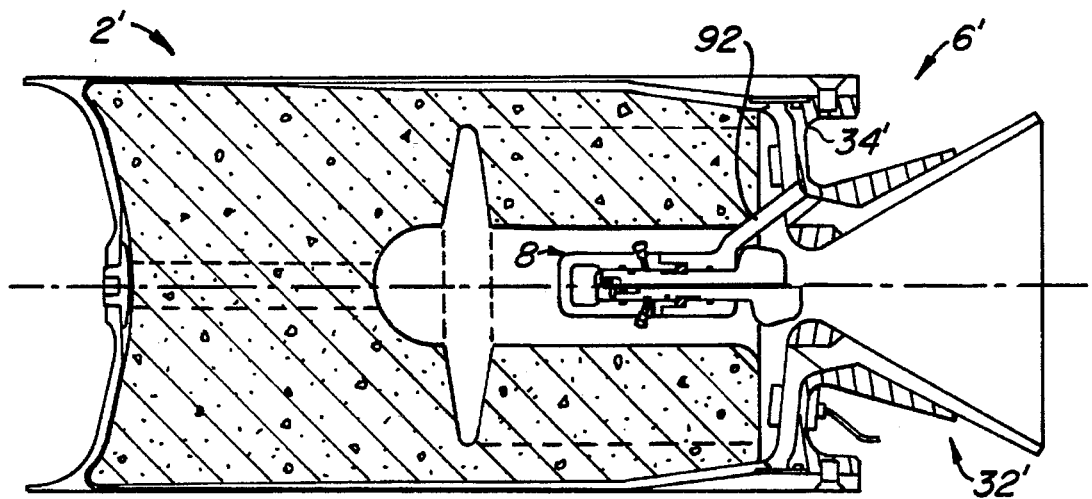
FIG. 7 is a sectional view of another embodiment of the invention.

Referring to FIG. 7, a further embodiment of the invention is shown. This embodiment differs from that shown in FIG. 1 in that a conventional single axial nozzle 32' is substituted for the annular nozzle and the pintle assembly is positioned in the combustion chamber and flipped 180°. A support arm 92 also extends form the pintle assembly housing (shown in FIG. 7) to the nozzle to maintain the pintle assembly housing in the desired position.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A rocket motor comprising:
   a motor casing forming a combustion chamber and having propellant therein;
   an exhaust nozzle extending from said motor casing and being fluidly coupled to said combustion chamber, said nozzle having a throat;
   a pintle assembly including a pintle and a support member, said pintle being coupled to said support member for movement from a first position to a second position where said pintle is positioned farther in said throat than when in said first position;
   a first locking member that secures sand pintle to said support member in said first position when the pressure in said combustion chamber is in a first range and releases said pintle from said support member when the pressure in said combustion chamber changes to a value in another range; and
   a second locking member coupled to said support member for securing said pintle in said second position to prevent said pintle from moving toward said first position.

2. The rocket motor of claim 1 wherein said first locking member is a frangible pin that extends from said support member into said pintle.

3. The rocket motor of claim 1 further including a stop member that is coupled to said support member and an abutment surface on said pintle, said stop member abutting said abutment surface when said pintle is in said second position to prevent said pintle from moving further away from said first position.

4. The rocket motor of claim 3 wherein said pintle includes a slot having a surface that forms said abutment surface and said stop member extends into said slot.

5. The rocket motor of claim 4 wherein said second locking member comprises a detent mechanism coupled to said support and a depression formed in said pintle, said detent mechanism registering said depression when said pintle is in said second position to prevent said pintle from moving toward said first position.

6. The rocket motor of claim 1 further including an actuating chamber and a valve, said actuating chamber being fluidly coupled to said combustion chamber when said valve is in an open position, said actuating chamber further being coupled to said pintle for exerting pressure thereon that tends to urge said pintle toward said second position when the pressure difference between said combustion chamber and actuating chamber exceeds a threshold value.

7. The rocket motor of claim 6 wherein said valve is a one-way valve that is configured to permit fluid flow into said an actuating chamber when the pressure difference between said combustion chamber and said actuating chamber exceeds a threshold value.

8. The rocket motor of claim 6 wherein pintle includes a first end portion in the vicinity of said throat and a second end portion spaced therefrom, said second end portion being fluidly coupled to said actuating chamber.

9. The rocket motor of claim 8 wherein said support surrounds said pintle and forms said actuating chamber.

10. The rocket motor of claim 9 further including a seal disposed between said pintle and said support member for preventing fluid in said chamber from escaping between said pintle and support member.

11. The rocket motor of claim 10 wherein said seal is annular.

12. The rocket motor of claim 8 wherein said pintle includes a channel having an inlet formed in said first end portion and fluidly coupled to said combustion chamber and an outlet formed in said second end position and fluidly coupled to said actuating chamber.

13. The rocket motor of claim 12 wherein said valve is positioned in said channel.

14. The rocket motor of claim 13 wherein said valve is a one-way valve that is configured to permit fluid flow into said actuating chamber when the pressure difference between said combustion chamber and actuating chamber exceeds a threshold value.

15. A rocket motor comprising:
- a motor casing forming a combustion chamber and having propellant therein;
- an exhaust nozzle extending from said motor casing and being fluidly coupled to said combustion chamber, said nozzle having a throat;
- a pintle assembly including a pintle and a support member, said pintle being coupled to said support member for movement from a first position to a second position where said pintle is positioned farther in said throat than when in said first position;
- a locking member that secures sand pintle to said support member in said first position when the pressure in said combustion chamber is in a first range and releases said pintle from said support member when the pressure in said combustion chamber changes to a value in another range;
- an actuating chamber and a valve, said actuating chamber fluidly coupled to said combustion chamber when said valve is in an open position, said actuating chamber further being coupled to said pintle for exerting pressure thereon that tends to urge said pintle toward said second position when the pressure difference between said combustion chamber and actuating chamber exceeds a threshold value; and
- wherein said pintle includes a first end portion in the vicinity of said throat and a second end portion spaced therefrom, said second end portion being fluidly coupled to said actuating chamber, said pintle further including a channel having an inlet formed in said first end portion and fluidly coupled to said combustion chamber and an outlet formed in said second end portion and fluidly coupled to said actuating chamber.

16. The rocket motor of claim 15 wherein said valve is positioned in said channel.

17. The rocket motor of claim 15 wherein said valve is a one-way valve that is configured to permit fluid flow into said actuating chamber when the pressure difference between said combustion chamber and actuating chamber exceeds a threshold value.

* * * * *